United States Patent
Oh et al.

(10) Patent No.: US 7,190,131 B2
(45) Date of Patent: Mar. 13, 2007

(54) DEVICE AND METHOD FOR STARTING BRUSHLESS DIRECT CURRENT MOTOR

(76) Inventors: Kwang Kyo Oh, #105-1403, Hyundai APT., Poongam-Dong, Seo-Gu, Gwangju-City (KR); Koji Hamaoka, #122-410, Cheomdan Line APT., Weolgae-Dong, Gwangsan-Gu, Gwangju-City (KR); Han Joo Yoo, #201-1704, Jookong APT., Woonnam-Dong, Gwangsan-Gu, Gwangju-City (KR); Pyeong Ki Park, #104-904, Hoban APT., Shinga-Dong, Gwangsan-Gu, Gwangju-City (KR); Hun Yub Bae, #101, Woori Oneroom 2nd, Ilgok-Dong, Buk-Gu, Gwangju-City (KR); Yun Jeong Kim, 997-58, Ssangchon-Dong, Seo-Gu, Gwangju-City (KR); Jeong Ho Seo, #808-3, Weolgae-Dong, Gwangsan-Gu, Gwangju-City (KR)

( * ) Notice: Subject to any disclaimer, the term of this patent is extended or adjusted under 35 U.S.C. 154(b) by 0 days.

(21) Appl. No.: 11/227,108

(22) Filed: Sep. 16, 2005

(65) Prior Publication Data
US 2006/0132071 A1  Jun. 22, 2006

(30) Foreign Application Priority Data
Dec. 21, 2004 (KR) ............. 10-2004-0109736

(51) Int. Cl.
*H02P 1/18* (2006.01)
(52) U.S. Cl. ............ 318/254; 318/138; 318/439; 318/434
(58) Field of Classification Search .......... 318/254, 318/138, 439, 700, 705, 711, 434
See application file for complete search history.

(56) References Cited

U.S. PATENT DOCUMENTS

| 5,486,743 | A | * | 1/1996 | Nagai ................. 318/439 |
| 5,608,300 | A | * | 3/1997 | Kawabata et al. ......... 318/721 |
| 5,616,994 | A | * | 4/1997 | Nagaoka et al. .......... 318/254 |
| 5,627,444 | A | * | 5/1997 | Fulks ................. 318/701 |
| 5,723,967 | A | * | 3/1998 | Hongo et al. ........... 318/254 |
| 5,814,957 | A | * | 9/1998 | Yoshida ............... 318/439 |

(Continued)

FOREIGN PATENT DOCUMENTS

KR  10-0313252 B1  11/2001

*Primary Examiner*—Rita Leykin
(74) *Attorney, Agent, or Firm*—Sughrue Mion, PLLC (57) ABSTRACT

A Brushless Direct Current (BLDC) motor starting method and device are provided. With the method and/or device, startup noise and vibration and startup failure rate can be reduced using a constant low-speed startup scheme when the BLDC motor is in startup mode. Additionally, Pulse Width Modulation (PWM) duty is also maintained at low level when the BLDC motor starts up, thereby preventing excessive current from occurring due to desynchronization of the motor at startup, so that it is possible to optimize specifications of an inverter in the BLDC motor. The BLDC motor starts up with a synchronous speed and a PWM duty of a rotor of the BLDC motor being kept constant, and the BLDC motor switches to sensorless mode if a position of the rotor is detected a predetermined number of times or more during a specific time period.

14 Claims, 8 Drawing Sheets

U.S. PATENT DOCUMENTS

| | | | |
|---|---|---|---|
| 5,857,349 A * | 1/1999 | Hamaoka et al. | 62/228.4 |
| 5,909,095 A * | 6/1999 | Sakti et al. | 318/254 |
| 5,917,785 A * | 6/1999 | Masaki et al. | 369/44.27 |
| 6,014,004 A * | 1/2000 | Hamaoka et al. | 318/778 |
| 6,034,494 A * | 3/2000 | Kitamine et al. | 318/254 |
| 6,054,776 A * | 4/2000 | Sumi | 290/17 |
| 6,281,656 B1 * | 8/2001 | Masaki et al. | 318/700 |
| 6,388,416 B1 * | 5/2002 | Nakatani et al. | 318/700 |
| 6,396,225 B1 * | 5/2002 | Wakui et al. | 318/254 |
| 6,462,492 B1 * | 10/2002 | Sakamoto et al. | 318/254 |
| 6,580,235 B2 * | 6/2003 | Laurent | 318/254 |
| 6,784,634 B2 * | 8/2004 | Sweo | 318/727 |
| 7,032,699 B2 * | 4/2006 | Sakata et al. | 180/247 |
| 2002/0140395 A1 * | 10/2002 | Tazawa et al. | 318/727 |
| 2004/0124807 A1 * | 7/2004 | Nakata et al. | 318/801 |
| 2004/0263104 A1 * | 12/2004 | Iwanaga et al. | 318/439 |
| 2005/0237017 A1 * | 10/2005 | Biamonte et al. | 318/439 |

* cited by examiner

DEVICE AND METHOD FOR STARTING BRUSHLESS DIRECT CURRENT MOTOR

CROSS-REFERENCE TO RELATED APPLICATION

This application claims priority from Korean Patent Application No. 2004-109736, filed on Dec. 21, 2004 in the Korean Intellectual Property Office, the disclosure of which is incorporated herein by reference.

BACKGROUND OF THE INVENTION

1. Field of the Invention

Apparatuses and methods consistent with the present invention relate to starting a Brushless Direct Current (BLDC) motor, and more particularly, to a device and method for starting a BLDC motor, in which a startup current is maintained at low level when the BLDC motor starts up, thereby reducing startup noise and vibration and startup failure rate.

2. Description of the Related Art

Generally, a sensorless BLDC motor includes a stator on which a coil is wound and a rotor that is provided in the stator and rotates to drive a load. The position of a rotor is detected based on a back electromotive force (EMF) appearing on coil terminals, and a voltage applied to the stator is controlled based on the detected position. Since the sensorless BLDC motor sets the time when the current is to flow based on the back EMF, the motor does not require a Hall sensor for magnetic polarity detection, achieving high reliability.

The sensorless BLDC motor is driven by estimating the position of the rotor based on the back EMF and generating a drive signal based on the estimated position. However, the position of the rotor cannot be detected effectively if the motor runs at low speed. That is, since the position of the rotor cannot be detected when the BLDC motor is in sensorless startup mode, a drive signal must be generated in a manner different from conventional driving methods.

Figure 1:
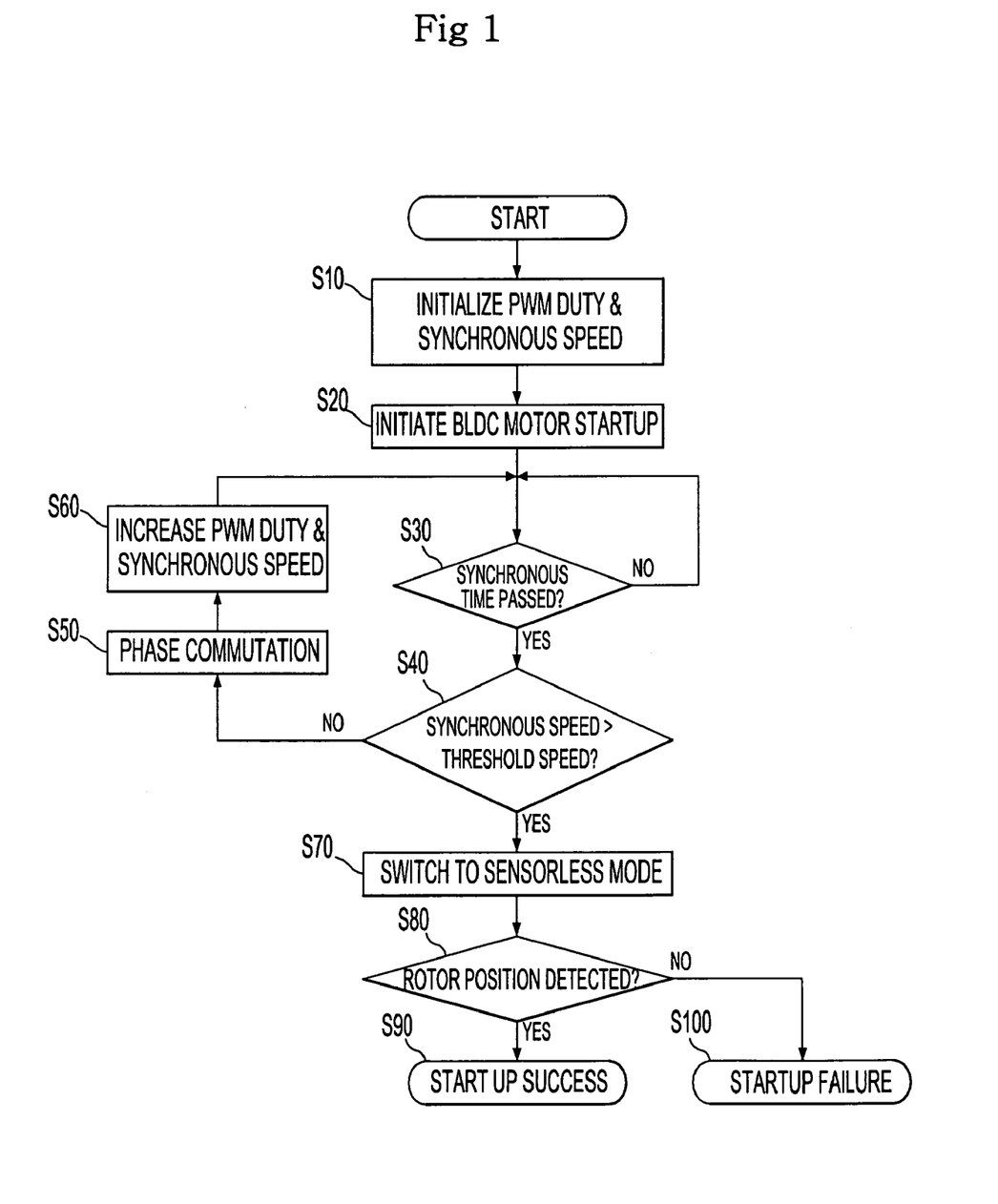
FIG. 1 is a flow chart of a conventional BLDC motor sensorless starting method.

In order to overcome this problem, as shown in FIG. 1, the BLDC motor starts up after an initial Pulse Width Modulation (PWM) duty is determined assuming an initial synchronous speed for starting the BLDC motor (S10 and S20). The BLDC motor continues to start up until a synchronous time set according to the PWM duty passes (S30).

If the synchronous time has passed, it is determined whether the synchronous speed is greater than or equal to a predetermined threshold speed (about 600 rpm) suitable for switching to the sensorless mode (S40). If the synchronous speed is less than the predetermined speed, phase commutation is performed, and the PWM duty and the synchronous speed are increased to drive and accelerate the motor (S50 and S60). If a synchronous time set according to the increased PWM duty has passed, it is determined whether the synchronous speed is greater than or equal to the threshold speed (S30 and S40).

Figure 2A:
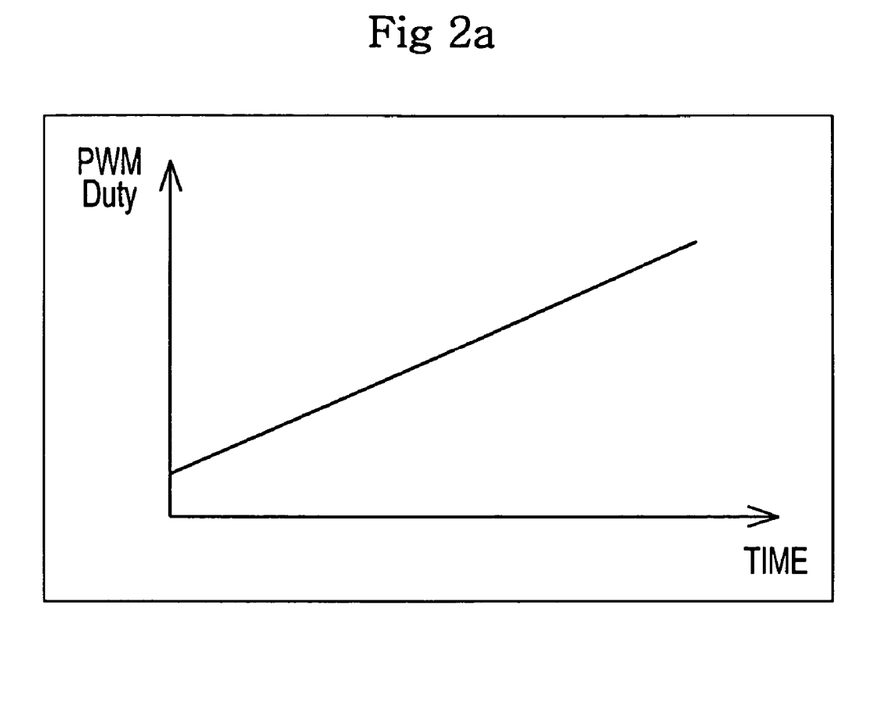
FIGS. 2a and 2b are graphs showing how PWM duty and speed vary when the conventional BLDC motor starts up.
Figure 2B:
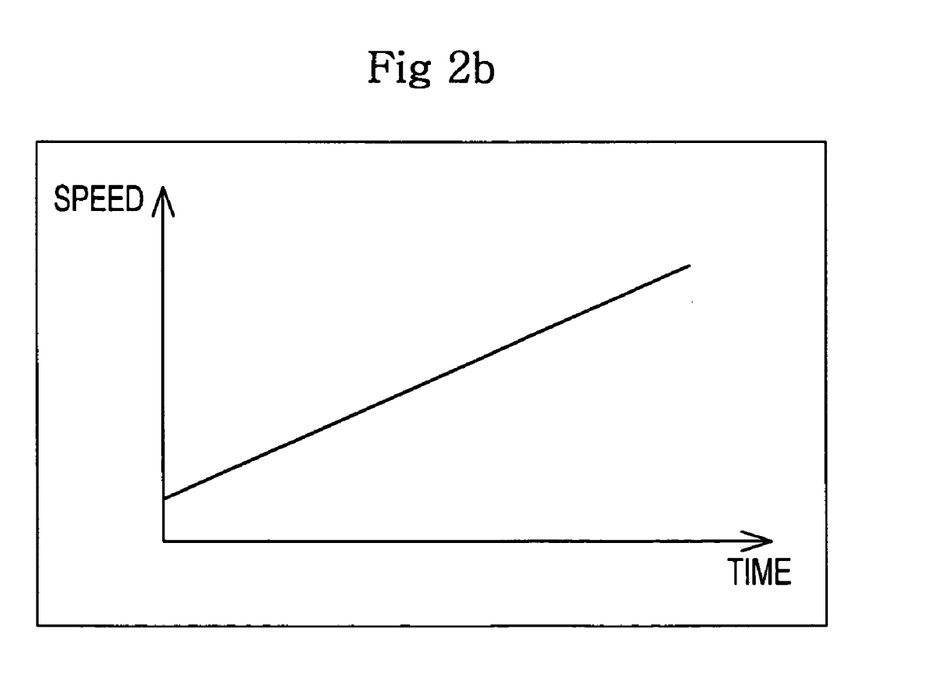

As shown in FIGS. 2a and 2b, the BLDC motor starts up by increasing the PWM duty and the synchronous speed while performing phase commutation until the synchronous speed exceeds the threshold speed suitable for switching to the sensorless mode. If the synchronous speed is greater than or equal to the threshold speed, the running mode of the BLDC motor switches to the sensorless mode (S70). Then, it is determined whether the position of the rotor is being detected (S80). If the position of the rotor is being detected, it indicates that the startup has succeeded, so that the motor continues to run in the sensorless mode (S90). If the position of the rotor is not detected, it is determined that the startup has failed, so that the BLDC motor takes action against the failure (S100).

It is very important for the sensorless BLDC motor to switch from the startup mode to the sensorless mode to achieve stable control. It is necessary to perform the switching to the sensorless mode at the moment when the rotor position detection is normally performed.

However, in the conventional BLDC motor starting method, since the PWM duty is constantly increased even though rotor position detection is not performed normally, the rotor position and the phase commutation time may become desynchronized depending on changes in the load torque of the BLDC motor, and the startup current may become excessively high, thereby causing high startup noise and vibration.

In addition, since the conventional BLDC motor starting method increases the rotor speed as described above, the rotor position and the phase commutation time may be desynchronized, increasing the startup failure rate, if the conventional BLDC motor starting method is applied to a system such as a compressor, whose load torque increases as the rotor speed increases. Also, an excessive startup current may occur, making it difficult to optimize specifications of the inverter.

SUMMARY OF THE INVENTION

It is an aspect of the invention to provide a method and device for starting a BLDC motor in which startup noise and vibration and startup failure rate can be reduced using a constant low-speed startup scheme when the BLDC motor is in startup mode.

It is another aspect of the invention to provide a method and device for starting a BLDC motor, which maintains a low PWM duty when the BLDC motor starts up, thereby preventing an excessive current from occurring due to the desynchronization at startup, so that it is possible to optimize specifications of an inverter in the BLDC motor.

It is yet another aspect of the invention to provide a method and device for starting a BLDC motor, which maintains a low startup current so that a system, whose load torque rapidly varies depending on a motor running speed, can be stably operated when the method and device is applied to such a system.

In accordance with an aspect of the invention, there is provided a method for starting a Brushless Direct Current (BLDC) motor, wherein a synchronous speed and a Pulse Width Modulation (PWM) duty of a rotor of the BLDC motor are kept constant when the BLDC motor is in startup mode.

If the BLDC motor initiates startup, a position of the rotor is periodically detected, and if the position of the rotor is detected consecutively a predetermined number of times or more, the BLDC motor switches to sensorless mode.

In accordance with another aspect of the invention, there is provided a method for starting a BLDC motor wherein, when the BLDC motor is in startup mode, it is determined whether the BLDC motor is to be switched to sensorless mode based on the number of times a rotor position of the BLDC motor is detected.

If the rotor position is detected consecutively a predetermined number of times or more, the BLDC motor switches to the sensorless mode.

If the rotor position is detected less than the predetermined number of times, and if the number of phase commutations performed by the BLDC motor is less than a predetermined maximum number of phase commutations, the BLDC motor continues to start up after performing phase commutation.

In accordance with still another aspect of the invention, there is provided a method for starting a BLDC motor, wherein the BLDC motor starts up with a synchronous speed and a PWM duty of a rotor of the BLDC motor being kept constant, and the BLDC motor switches to sensorless mode if a position of the rotor is detected a predetermined number of times or more during a specific time period.

If the number of times the rotor position is detected is less than the predetermined number of times, the BLDC motor continues to start up after performing phase commutation.

The BLDC motor does not switch to the sensorless mode until the phase commutation is performed a predetermined number of times.

The phase commutation is performed when the number of phase commutations performed by the BLDC motor is less than a predetermined maximum number.

The BLDC motor switches to the sensorless mode if the number of phase commutations performed by the BLDC motor is the predetermined maximum number or more.

If the number of phase commutations performed by the BLDC motor is the predetermined maximum number or more, it is determined that startup of the BLDC motor has failed.

In accordance with yet another aspect of the invention, there is provided a device for starting a BLDC motor, the device comprising a terminal voltage detector for detecting a voltage of the BLDC motor and detecting a rotor position signal; and a controller for determining whether to switch to sensorless mode, based on the number of times the rotor position signal is detected.

The BLDC motor starts up while maintaining a constant synchronous speed and a constant rotor PWM duty.

If the rotor position signal is detected consecutively a predetermined number of times or more during a predetermined time, the controller switches to the sensorless mode.

If the rotor position signal is detected less than the predetermined number of times, the controller continues the BLDC motor to start up after performing phase commutation.

The controller does not switch to the sensorless mode until phase commutation is performed a predetermined number of times.

BRIEF DESCRIPTION OF THE DRAWINGS

The above and/or other aspects of the invention will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 3:
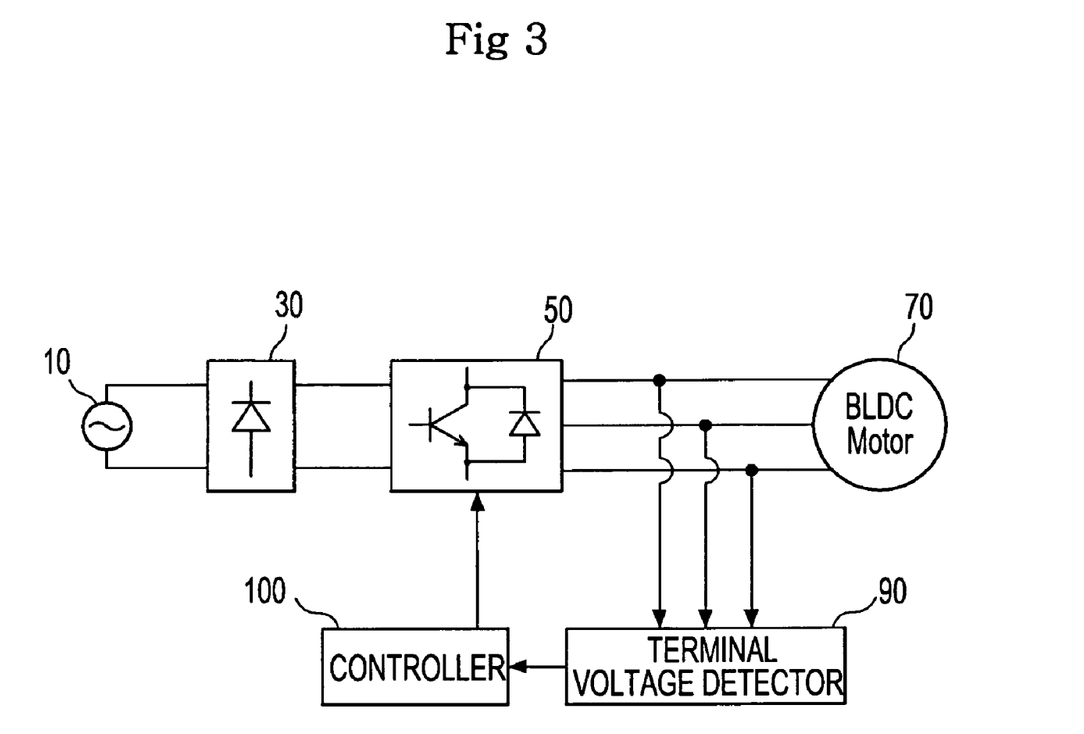
FIG. 3 is a block diagram of a BLDC motor sensorless starting device according to an exemplary embodiment of the present invention.

As shown in FIG. 3, a sensorless BLDC motor starting device according to an exemplary embodiment of the present invention comprises a power source 10, an AC-to-DC power converter 30, an inverter 50, a terminal voltage detector 90, and a controller 100. The power source 10 supplies commercial AC power, and the converter 30 converts the AC power into DC power. The inverter 50 converts the DC power output from the converter 30 into three-phase AC power by alternately turning on and off a plurality of power transistors in order to rotate a BLDC motor 70. The terminal voltage detector 90 detects a back EMF in the BLDC motor 70 to detect a rotor position signal of the BLDC motor 70. The controller 100 generates a control signal, which is provided to the inverter 50, based on the rotor position detected by the terminal voltage detector 90.

Figure 4:
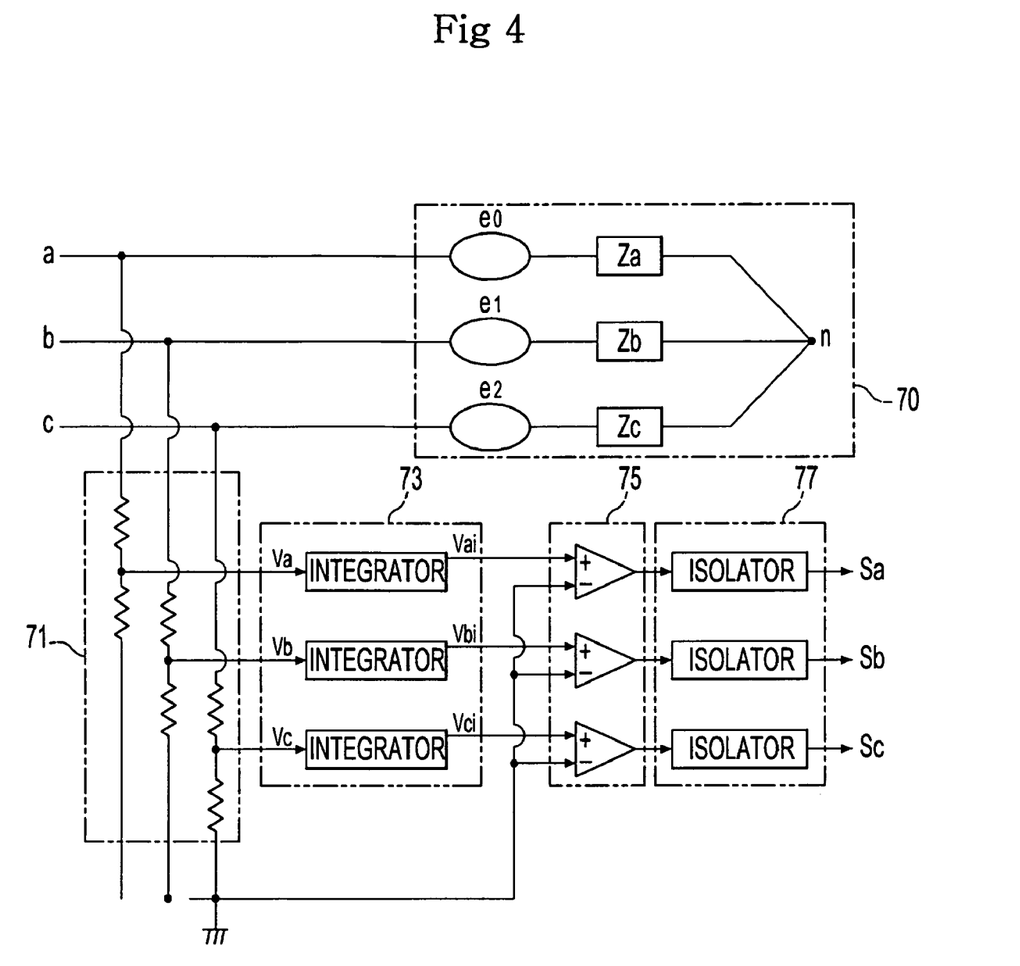
FIG. 4 is a block diagram of a terminal voltage detector in the sensorless starting device shown in FIG. 3.

As shown in FIG. 4, the terminal voltage detector 90 comprises a power divider 71 for detecting a back EMF signal of the BLDC motor 70 and reducing the detected back EMF signal to predetermined levels, an integrator 73 for generating a triangle wave with a phase delay of 90 degrees from the reduced back EMF signal, a comparator 75 for comparing the output of the integrator 73 with a neutral voltage of the back EMF to generate a square wave, and an isolator 77 for converting the square signal from the comparator 75 based on the DC ground.

If the sensorless BLDC motor starting device configured as described above receives commercial AC power through the power source 10, the converter 30 converts the AC power to DC power, and the inverter 50 alternately turns on and off six power transistors (not shown) to convert the DC power output from the converter 30 into three-phase (u, v, and w-phase) AC power to rotate the BLDC motor 70.

Here, an initial synchronous speed and an initial Pulse Width Modulation (PWM) duty for starting the BLDC motor 70 must be set taking into account characteristics of the BLDC motor 70 and characteristics of the terminal voltage detector 90. For example, the initial synchronous speed is set to about 100 rpm, and the initial PWM duty is determined based on the synchronous speed. The synchronous speed may also be set to a suitable value other than 100 rpm.

Figure 5A:
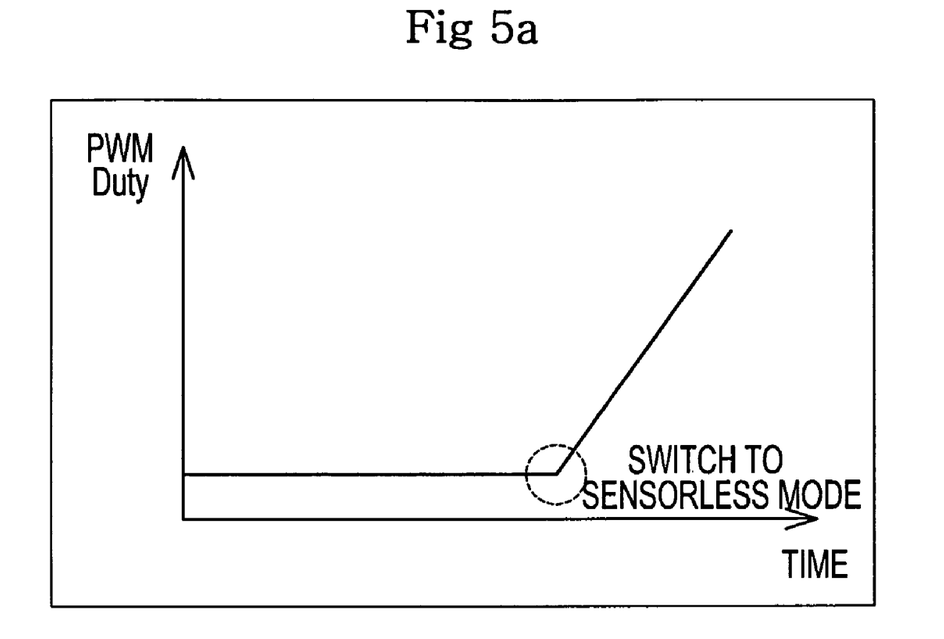
FIGS. 5a and 5b are graphs showing how PWM duty and speed vary when the BLDC motor shown in FIG. 3 starts up.
Figure 5B:
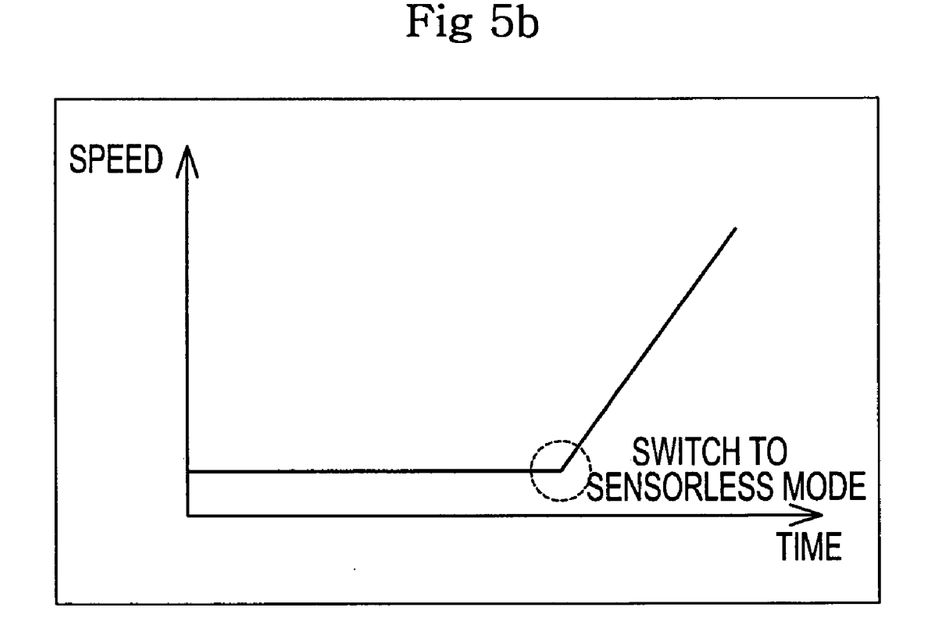

The BLDC motor 70 starts up according to the set initial synchronous speed and PWM duty. The BLDC motor 70 performs phase commutation at predetermined time intervals that are synchronous with the PWM duty. Here, the PWM duty is maintained at the initially set level, and the phase commutation time interval is maintained at the same time interval as when the first phase commutation is performed. That is, when the BLDC motor 70 starts up, the PWM duty and the synchronous speed maintain constant levels as shown in FIGS. 5a and 5b. The BLDC motor 70 continues to start up with the initially set PWM duty and synchronous speed until it switches to sensorless mode.

To determine when to switch the operating mode of the BLDC motor 70 from the startup mode to the sensorless mode, signals detected by the terminal voltage detector 90 must be checked to determine whether the rotor position is being detected. If the rotor position is detected consecutively a predetermined number of times or more, the controller 100 switches the operating mode of the motor 70 to the sensorless mode.

Figure 6:
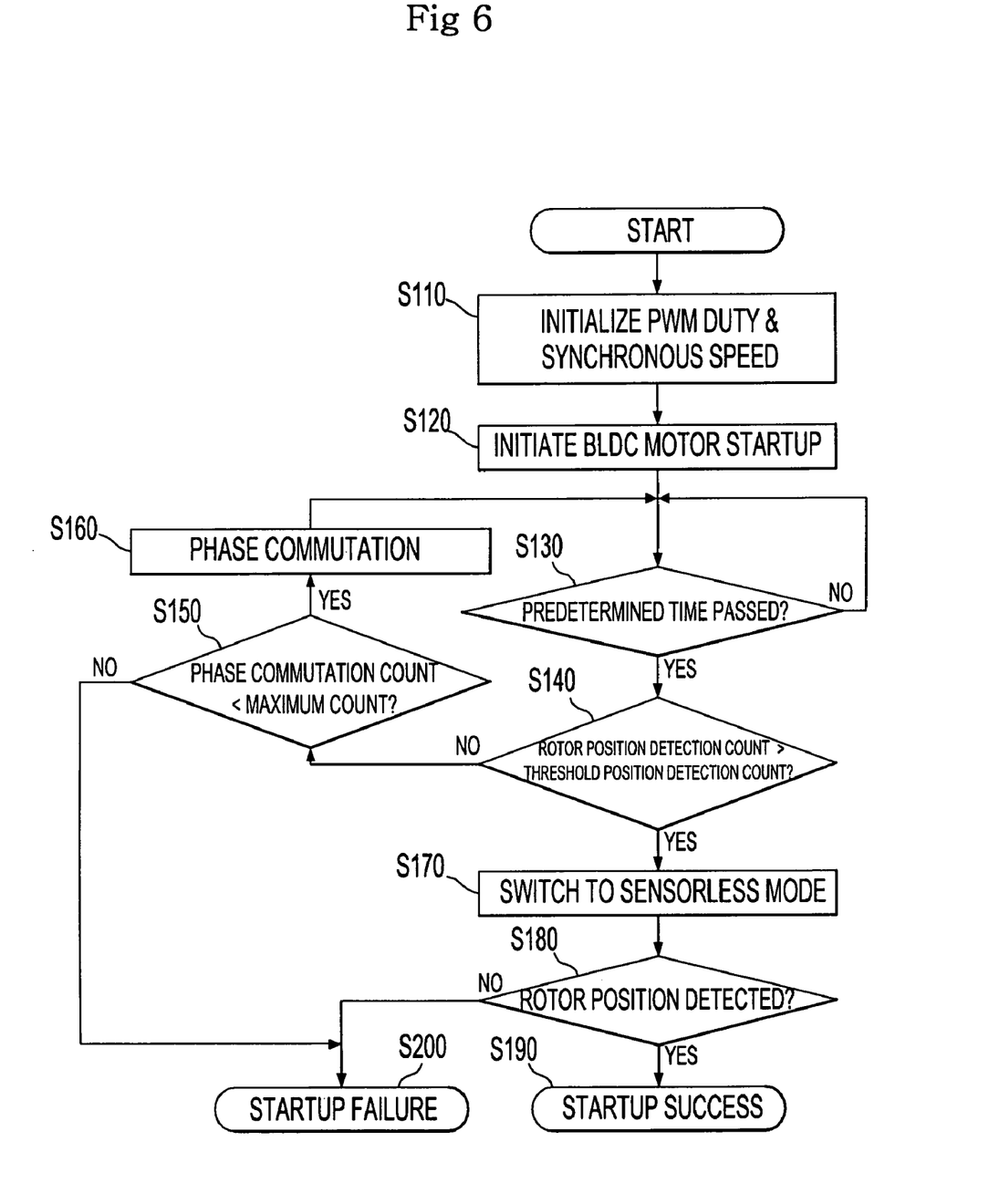
FIG. 6 is a flow chart of a BLDC motor sensorless starting method according to a first exemplary embodiment of the present invention.

A BLDC motor sensorless starting method according to a first exemplary embodiment of the present invention will now be described with reference to FIG. 6.

First, an initial PWM duty and an initial synchronous speed are set to apply a starting algorithm of the BLDC motor 70 (S110). If the initial PWM duty and synchronous speed are set, the BLDC motor 70 initiates startup according to the set PWM duty and synchronous speed (S120). If the controller 100 transfers a signal, which initiates startup of the BLDC motor 70, to the inverter, AC power is supplied from the power source 10, and the AC power is converted to DC power through the converter 30, and the DC power is then converted to three-phase AC power through the inverter 50. The three-phase AC power causes the BLDC motor 70 to rotate.

After the BLDC motor 70 initiates startup, it is determined whether a predetermined time according to the PWM duty and synchronous speed has passed (S130). The BLDC motor 70 continues to start up while maintaining the current condition until the predetermined time passes. Here, the terminal voltage detector 90 periodically detects the rotor position, and outputs the detected rotor position signal to the controller 100.

If the predetermined time passes, it is determined whether the number of times the terminal voltage detector 90 has detected the rotor position is greater than or equal to a threshold number of rotor position detections suitable for switching to the sensorless mode (S140). The threshold number of rotor position detections is set to several detections, taking into account the characteristics of the BLDC motor 70, under the assumption that the rotor position is consecutively detected. For example, if the threshold rotor position detection number is set to three, it is determined whether the terminal voltage detector 90 has consecutively detected the rotor position three times or more.

If the number of times the rotor position has been detected is less than the threshold rotor position detection number suitable for switching to the sensorless mode, it is determined whether the number of times phase commutation is performed after the motor initiates startup is less than a predetermined maximum allowable number of phase commutations (S150). The maximum allowable number of phase commutations is set to several tens of phase communications. The reason why the number of phase commutations is limited in this manner is that it is undesirable to continue the BLDC motor 70 to start up for a long time.

If the number of phase commutations is less than the maximum allowable phase commutation number, the BLDC motor 70 continues to start up with the initially set PWM duty and synchronous speed after performing phase commutation (S160). If a time initially set according to the PWM duty and synchronous speed passes, it is determined whether the number of times the terminal voltage detector 90 has detected the rotor position until then is greater than or equal to the threshold rotor position detection number (S130 and S140).

If the rotor position detection number is less than the threshold rotor position detection number suitable for switching to the sensorless mode, phase commutation is performed so long as the number of phase commutations is less than the maximum allowable phase commutation number (S150 and S160), and then operations S130 to S150 are repeated. If the number of phase commutations is greater than or equal to the maximum allowable number of phase commutations, the BLDC motor 70 no longer continues to start up, it is determined that the startup has failed, and then the BLDC motor 70 stops its startup (S200). determined that the startup has failed, and then the BLDC motor 70 stops startup (S200).

If the number of rotor position detections performed by the BLDC motor 70 is greater than or equal to the threshold rotor position detection number, it is determined that the number of rotor position detections is suitable for switching to the sensorless mode, and the BLDC motor 70 enters the sensorless mode and runs in the sensorless mode (S170). The terminal voltage detector 90 then determines whether the rotor position is being detected (S180). If the rotor position is being detected, it is determined that the starting is successful (S190), otherwise it is determined that the starting has failed (S200).

Figure 7:
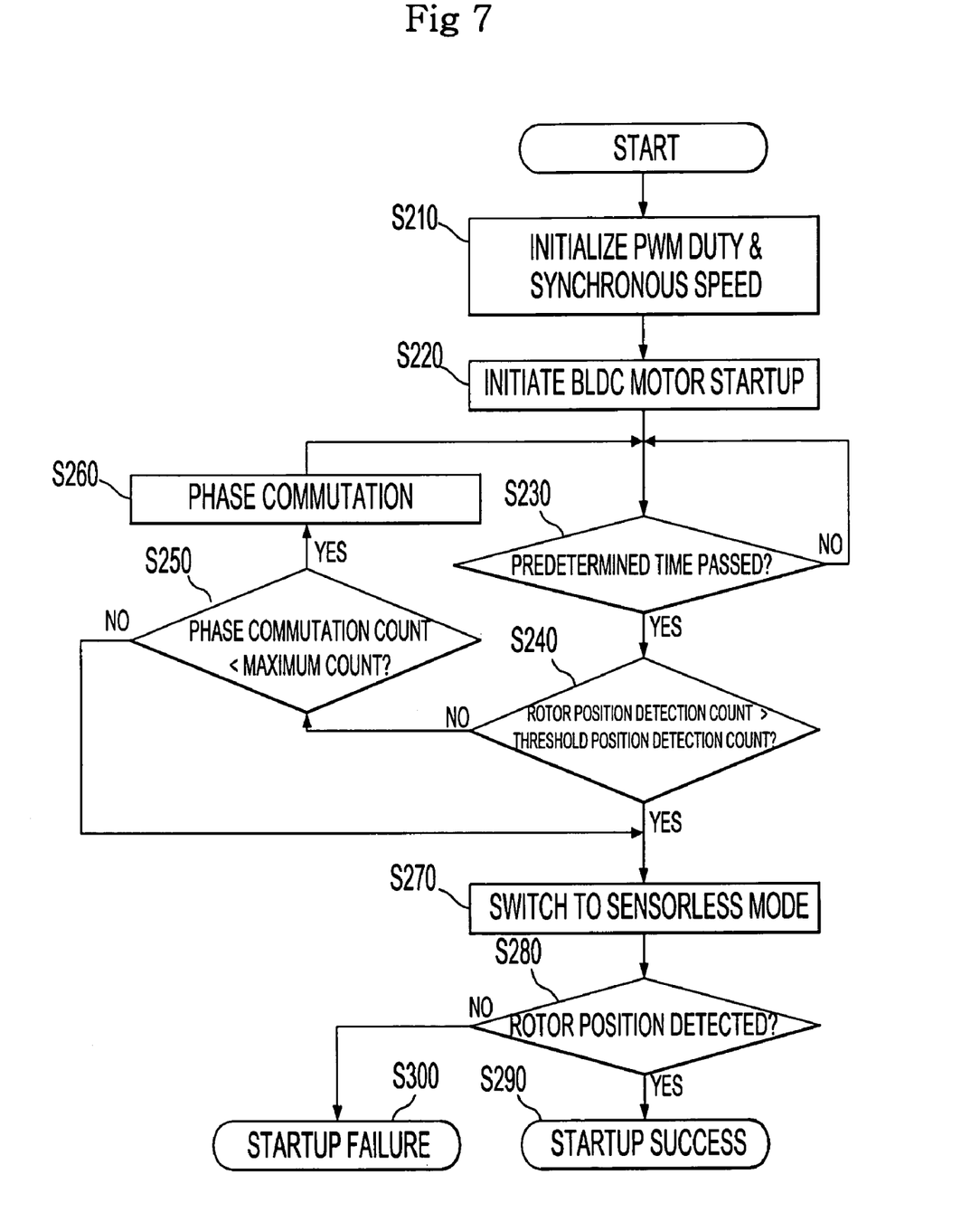
FIG. 7 is a flow chart of a BLDC motor sensorless starting method according to a second exemplary embodiment of the present invention.

A BLDC motor sensorless starting method according to a second exemplary embodiment of the present invention will now be described with reference to FIG. 7. Most processes of the BLDC motor sensorless starting method according to the second exemplary embodiment are the same as described above in the first embodiment. However, if the number of phase commutations is greater than or equal to a maximum allowable phase commutation number at operation S250, the motor switches the operating mode to the sensorless mode (S270), which is different from the first embodiment. This is to switch the operating mode of the motor to the sensorless mode in order to reduce the starting failure rate even if the consecutive rotor position detections are not performed until the phase commutation is performed a predetermined number of times or more. Of course, even if the operating mode of the motor is switched to the sensorless mode, only when the rotor position is detected by the terminal voltage detector 90, is it determined that the starting is successful, otherwise it is determined that the starting is unsuccessful (S280 to S300).

According to a third exemplary embodiment of the present invention, it is determined whether the BLDC motor 70 is to switch to the sensorless mode, based on a position signal detected after phase commutation is performed a predetermined number of times (for example, several times), taking into consideration that a position signal detected until phase commutation is performed the predetermined number of times after the BLDC motor initiates startup is likely to be a noise signal rather than a signal due to back EMF of the BLDC motor. This method avoids problems caused by the noise.

Figure 8:
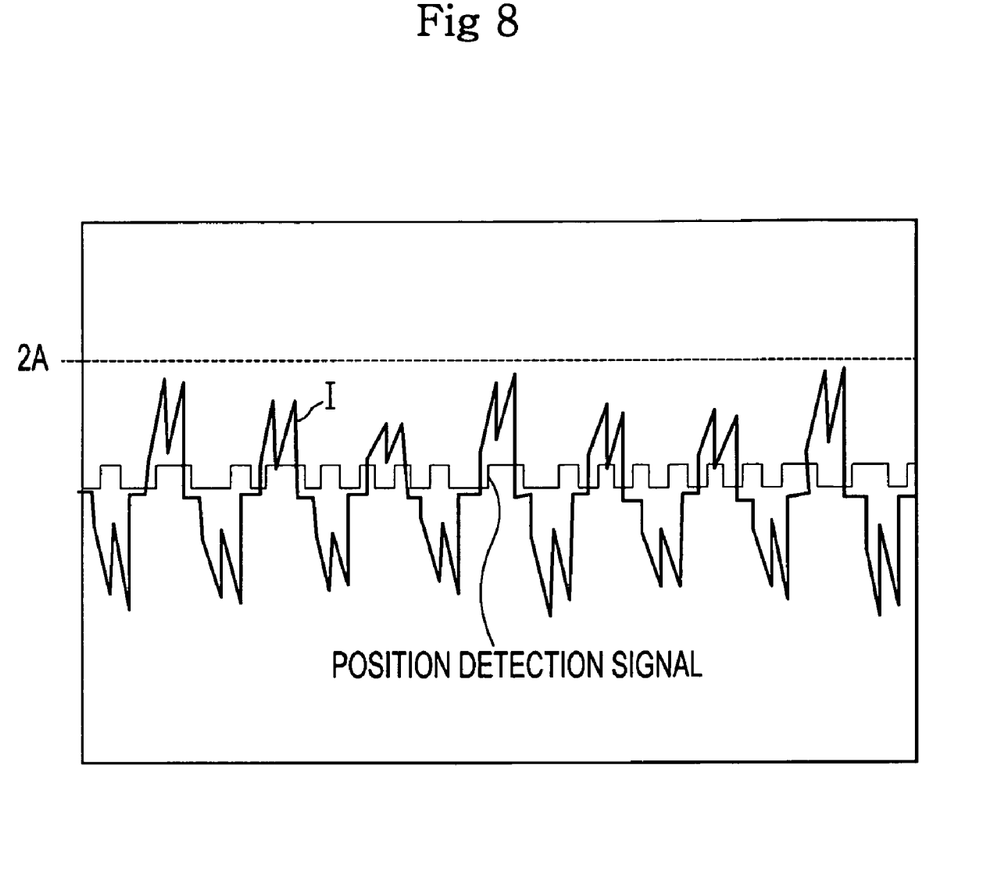
FIG. 8 is a graph showing a current waveform of a BLDC motor according to an exemplary embodiment of the present invention when it starts up.

As described above, in the BLDC motor starting method according to the present invention, since phase commutation time is performed is kept constant and thus the motor is not accelerated, the likelihood that the BLDC motor will be desynchronized is reduced. Also, since the PWM duty is not raised, an excessive startup current does not occur when startup is unsuccessful. It can be seen from FIG. 8 that the startup current is maintained under level 2A and the rotor position is also detected in a stable pattern.

As is apparent from the above description, a device and method for starting a BLDC motor according to the present invention has the following advantages.

It is possible to reduce startup noise and vibration and startup failure rate using a constant low-speed startup scheme.

Also, PWM duty is maintained at a low and constant level when the BLDC motor starts up, thereby preventing an excessive current from occurring due to desynchronization at startup, so that it is possible to optimize specifications of an inverter in the BLDC motor.

Further, when the method and device according to the present invention is applied to a system, whose load torque rapidly varies depending on a motor running speed, a startup current can be maintained at a low level so that such a system can be stably operated.

Although exemplary embodiments of the present invention have been shown and described, it would be appreciated by those skilled in the art that changes may be made in the exemplary embodiments without departing from the principles and spirit of the invention, the scope of which is defined in the claims and their equivalents.

What is claimed is:

1. A method for starting a Brushless Direct Current (BLDC) motor, the method comprising:
    operating the BLDC motor in a startup mode in which a synchronous speed and a Pulse Width Modulation (PWM) duty of a rotor of the BLDC motor are maintained at constant levels.

2. The method according to claim 1, further comprising:
    periodically detecting a position of the rotor while the BLDC motor is operated in the startup mode; and
    determining whether to switch operation of the BLDC motor to a sensorless mode based on a number of times a rotor position of the BLDC motor is detected.

3. The method according to claim 2, wherein the operation of the BLDC motor is switched to the sensorless mode if the number of times the rotor position is consecutively detected is at least a predetermined number of times.

4. The method according to claim 2, wherein if the rotor position is detected less than a predetermined number of times and a number of phase commutations performed by the BLDC motor is less than a predetermined maximum number of phase commutations, the operation of the BLDC motor in the startup mode is continued after performing phase commutation.

5. A method for starting a Brushless Direct Current (BLDC) motor, the method comprising:
    operating the BLDC in a startup mode in which a synchronous speed and a Pulse Width Modulation (PWM) duty of a rotor of the BLDC motor are maintained at constant levels; and
    switching operation of the BLDC motor to a sensorless mode if a position of the rotor is detected at least a first predetermined number of times during a predetermined time period.

6. The method according to claim 5, wherein if a number of times the rotor position is detected is less than the first predetermined number of times, the operation of the BLDC motor in the startup mode is continued after performing phase commutation.

7. The method according to claim 6, wherein switching the operation of the BLDC motor to the sensorless mode is performed if the position of the rotor is detected at least the first predetermined number of times during the predetermined time period and the phase commutation is performed a second predetermined number of times.

8. The method according to claim 6, wherein the phase commutation is performed by the BLDC motor if the number of times the position of the rotor is detected is less than the first predetermined number of times and a number of times the phase commutation is performed is less than a predetermined maximum number.

9. The method according to claim 8, wherein switching the operation of the BLDC motor to the sensorless mode is performed if the position of the rotor is detected at least the first predetermined number of times and the number of times the phase commutation is performed by the BLDC motor is at least the predetermined maximum number.

10. The method according to claim 8, wherein if the number of times the phase commutation is performed by the BLDC motor is at least the predetermined maximum number, it is determined that startup of the BLDC motor has failed.

11. A device for starting a Brushless Direct Current (BLDC) motor, the device comprising:
    a terminal voltage detector which detects a voltage of the BLDC motor and detects a rotor position signal; and
    a controller which determines whether to switch operation of the BLDC motor from a startup mode to a sensorless mode based on a number of times the rotor position signal is detected, wherein the controller initially controls the operation of the BLDC motor to be in a startup mode in which a synchronous speed and a Pulse Width Modulation (PWM) duty of a rotor of the BLDC motor are maintained at constant levels.

12. The device according to claim 11, wherein if the rotor position signal is consecutively detected a first predetermined number of times during a predetermined time period, the controller switches the operation of the BLDC motor to the sensorless mode.

13. The device according to claim 12, wherein if the rotor position signal is detected less than the first predetermined number of times, the controller continues the operation of the BLDC motor in the startup mode after performing phase commutation.

14. The device according to claim 12, wherein the controller does not switch the operation of the BLDC motor to the sensorless mode until phase commutation is performed a second predetermined number of times.

* * * * *